(12) United States Patent
Eromaki et al.

(10) Patent No.: US 11,428,956 B2
(45) Date of Patent: Aug. 30, 2022

(54) EYEGLASS FRAME

(71) Applicant: Huawei Technologies Co., Ltd., Shenzhen (CN)

(72) Inventors: Marko Eromaki, Tampere (FI); Panu Johansson, Kista (SE); Antti Erik Peuhkurinen, Kista (SE); Harri Hakulinen, Helsinki (FI); Annika Hautamäki, Kista (SE); Jari Tuomas Savolainen, Helsinki (FI); Lauri Jääskelä, Kista (SE); Thomas Rücker, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 16/635,876

(22) PCT Filed: Aug. 2, 2017

(86) PCT No.: PCT/EP2017/069547
§ 371 (c)(1),
(2) Date: Jan. 31, 2020

(87) PCT Pub. No.: WO2019/024992
PCT Pub. Date: Feb. 7, 2019

(65) Prior Publication Data
US 2020/0341300 A1  Oct. 29, 2020

(51) Int. Cl.
*G02C 7/14* (2006.01)
*G02C 7/08* (2006.01)
(Continued)

(52) U.S. Cl.
CPC ............... *G02C 7/14* (2013.01); *G02C 7/083* (2013.01); *G02C 11/10* (2013.01); *G02B 2027/0178* (2013.01); *G02C 2200/08* (2013.01)

(58) Field of Classification Search
CPC .......... G02C 7/14; G02C 7/083; G02C 11/10; G02C 2200/08; G02B 2027/0178;
(Continued)

(56) References Cited
U.S. PATENT DOCUMENTS

| 1,879,516 A | 9/1932 | Rowan |
| 4,806,011 A | 2/1989 | Bettinger |

(Continued)

FOREIGN PATENT DOCUMENTS

| CN | 102918444 A | 2/2013 |
| CN | 104160325 A | 11/2014 |

(Continued)

*Primary Examiner* — Darryl J Collins
*Assistant Examiner* — Matthew Y Lee
(74) *Attorney, Agent, or Firm* — Conley Rose, P.C.

(57) ABSTRACT

A system comprises a smartwatch and an eyeglass frame. The eyeglass frame comprises a front piece, a pair of temples, and an optical element connected to the front piece. Each temple is hinged to an end of the front piece to allow the pair of temples to move between a folded position and an open position, where at least one temple of the pair of temples comprises an adapter to receive the smartwatch. The optical element is connected to the front piece and is configured to reflect light from the smart watch to an eye of a user.

20 Claims, 4 Drawing Sheets

(51) Int. Cl.
*G02C 11/00* (2006.01)
*G02B 27/01* (2006.01)

(58) Field of Classification Search
CPC ....... G02B 27/017; G02B 27/01; G06F 1/163;
G06F 3/0488; A61B 5/681
USPC ........................................................ 351/158
See application file for complete search history.

(56) References Cited

U.S. PATENT DOCUMENTS

| | | | |
|---|---|---|---|
| 5,682,173 | A | 10/1997 | Holakovszky et al. |
| 6,057,966 | A | 5/2000 | Carroll et al. |
| 6,474,808 | B1 * | 11/2002 | Bettinger ........... G02B 27/0176 |
| | | | 351/158 |
| 2007/0046887 | A1 * | 3/2007 | Howell ................. G02C 11/10 |
| | | | 351/41 |
| 2012/0127420 | A1 | 5/2012 | Blum et al. |
| 2012/0249797 | A1 | 10/2012 | Haddick et al. |
| 2013/0100511 | A1 | 4/2013 | Yamamoto et al. |
| 2013/0215374 | A1 | 8/2013 | Blum et al. |
| 2015/0279254 | A1 | 10/2015 | Zheng et al. |
| 2016/0299344 | A1 | 10/2016 | Dobschal et al. |
| 2017/0038593 | A1 | 2/2017 | Travers |

FOREIGN PATENT DOCUMENTS

| | | |
|---|---|---|
| CN | 105765443 A | 7/2016 |
| CN | 106489177 A | 3/2017 |
| WO | 2016044612 A1 | 3/2016 |

* cited by examiner

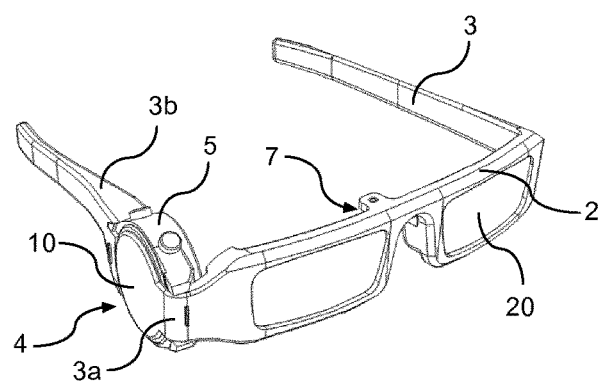
Fig. 3a
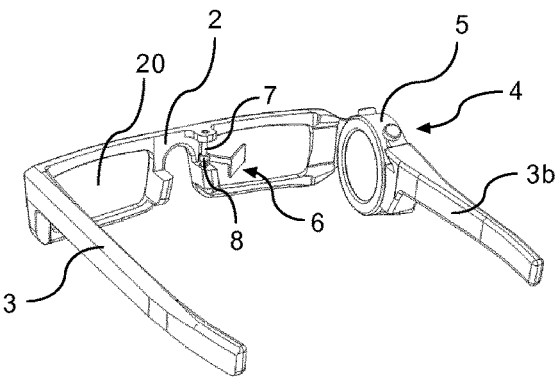
Fig. 3b
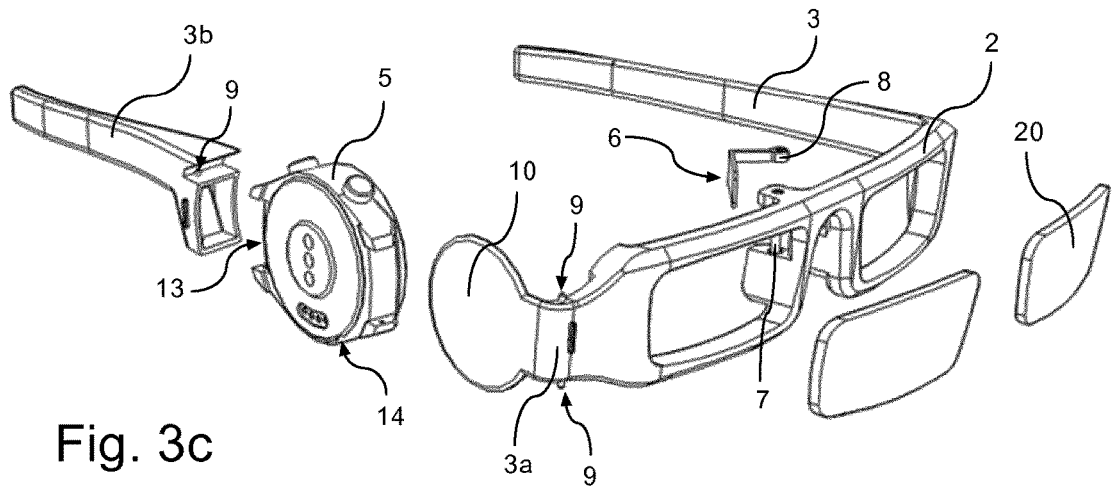
Fig. 3c
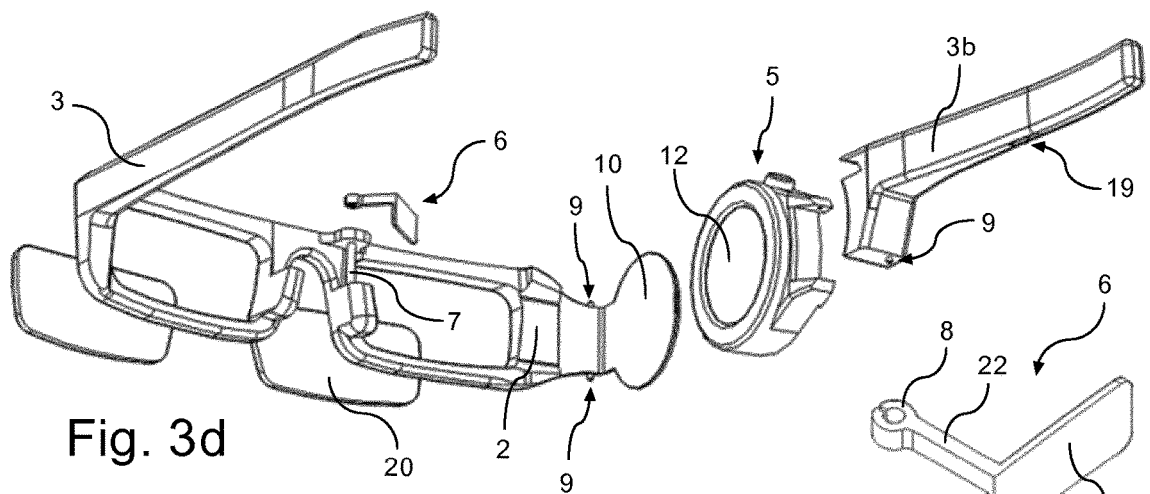
Fig. 3d
Fig. 3e

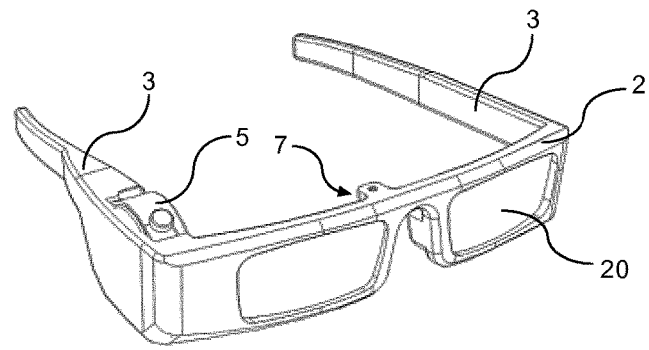
Fig. 4a
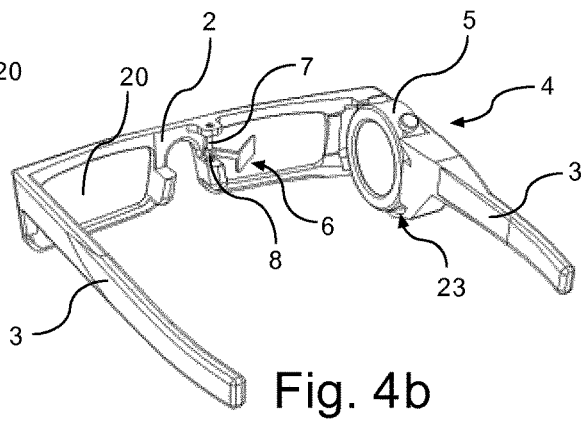
Fig. 4b
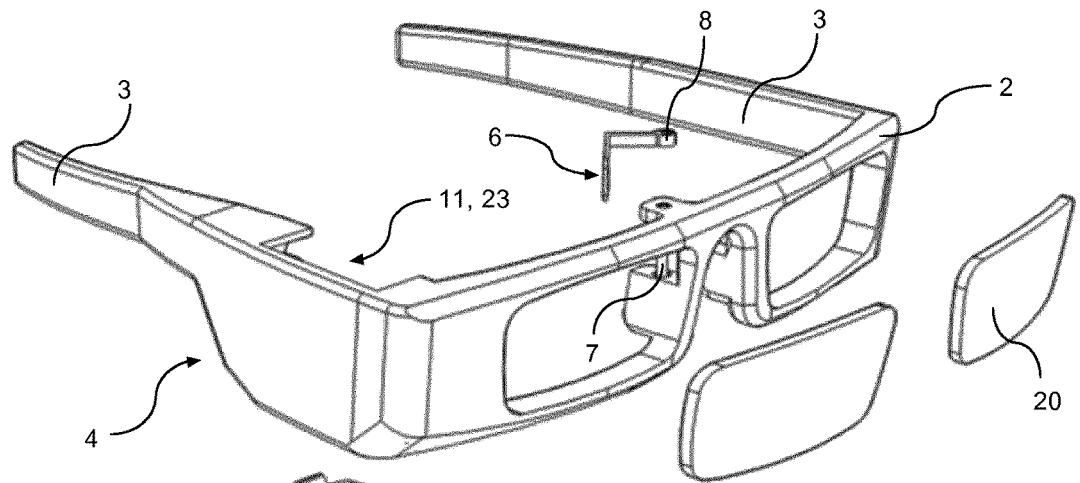
Fig. 4c
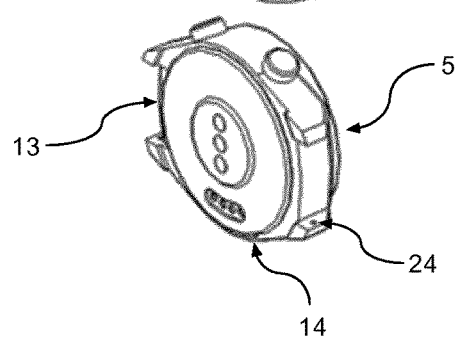

EYEGLASS FRAME

CROSS-REFERENCE TO RELATED APPLICATIONS

This application is a National Stage of International Patent Application. No. PCT/EP2017/069547 filed on Aug. 2, 2017, which is hereby incorporated by reference in its entirety.

TECHNICAL FIELD

The disclosure relates to an eyeglass frame comprising a front piece and a pair of temples, each temple being hingedly connected to an end of the front piece to allow the temples to move between a folded and an open position.

BACKGROUND

The interest in some wearable devices such as augmented reality headsets is decreasing due to built-in limitations. For example, augmented reality headsets are oftentimes large, heavy, and expensive units suitable only for a static user experience involving gaming, video, or other indoor-type content.

Due to the large size, augmented reality headsets need to be tightly strapped around the head of the user, making this kind of device less of an actual wearable especially since it is not very suitable for outdoor use.

Further, the large size and heavy weight makes users unwilling to wear such augmented reality headsets on a daily basis. Also, the complexity of current augmented reality headsets keeps the price level relatively high, which limits the possibilities for developers to concept new applications without having to make significant investments in hardware.

SUMMARY

It is an object to provide an eyeglass frame for an electronic device which improves known solutions and which provides for an increased usability.

The foregoing and other objects are achieved by the features of the independent claim. Further implementation forms are apparent from the dependent claims, the description, and the figures.

According to a first aspect, there is provided an eyeglass frame comprising a front piece and a pair of temples, each temple being hingedly connected to an end of the front piece to allow the temples to move between a folded and an open position, at least one temple comprising an adapter for receiving an electronic device. A frame comprising a front piece and two temples is a well-tried and comparatively comfortable solution to be worn on a user's head. The addition of an adapter for receiving an electronic device allows the frame to not only function as eyeglasses, but also as a lightweight, discrete, and comparatively cheap augmented reality headset.

In a first possible implementation form of the first aspect, the eyeglass frame further comprises at least one optical element connected to the front piece, the optical element being adapted for reflecting light from an electronic device to an eye of a user, the optical element being a discrete component more or less masked by the front piece.

In a second possible implementation form of the first aspect, the optical element comprises a semi-transparent or opaque surface, providing a simple and reliable solution for reflecting light emitted by the electronic device.

In a third possible implementation form of the first aspect, the optical element further comprises optical focusing means, allowing the eyeglass frame to be used for a variety of purposes by a variety of users.

In a fourth possible implementation form of the first aspect, the optical element has at least two degrees of freedom, making the optical element flexible and allowing it to be positioned in a way that suits the user.

In a fifth possible implementation form of the first aspect, the front piece comprises a shaft element, the optical element being detachably connected to the shaft element by means of a C-shaped gripper adapted for snapping onto the shaft element, allowing the optical element to be removed from the eyeglass frame, and the eyeglass frame to be used as a regular pair of eyeglasses or for example as a mere recording device.

In a sixth possible implementation form of the first aspect, the temple comprises of a primary temple part and a secondary temple part, the primary temple part being hinged to the front piece, the adapter comprising locking means arranged at one end of each temple part, respectively, for interlocking with the electronic device, facilitating a lightweight frame without unnecessary material consumption.

In a seventh possible implementation form of the first aspect, the adapter further comprises a cover plate for covering one side of the electronic device, providing a stable and protective structure for maintaining the electronic device within the adapter.

In an eight possible implementation form of the first aspect, the adapter comprises a recess provided on an inside of the temple, facilitating a frame which can be used both with and without an electronic device.

In a ninth possible implementation form of the first aspect, the recess is adapted for retaining the electronic device by means of a mechanical connection, allowing simple and quick attachment of the electronic device.

In a tenth possible implementation form of the first aspect, the mechanical connection comprises at least one of a snap locking element or a clamping element, allowing simple and secure attachment of the electronic device.

In an eleventh possible implementation form of the first aspect, the eyeglass frame further comprises at least one electronic device, allowing the eyeglass frame to be used e.g. as an augmented reality headset.

In a twelfth possible implementation form of the first aspect, the electronic device comprises at least one of a display, a speaker, a microphone, a camera, a sensor, and/or a vibration motor, facilitating use of the eyeglass frame for a variety of applications.

In a thirteenth possible implementation form of the first aspect, the front piece comprises an opening accommodating a camera viewing angle of the camera, allowing the eyeglass frame to be used for recording its surroundings.

In a fourteenth possible implementation form of the first aspect, at least one of the temples comprises an audio channel, the audio channel having an audio inlet arranged within the adapter, the audio channel having an audio outlet adapted for being in an ear region of a user, allowing the eyeglass frame to be used for transmitting audio to the user.

In a fifteenth possible implementation form of the first aspect, the temple is provided with a protruding element, the protruding element comprising the audio outlet, facilitating more focused and discrete audio transmission to the user.

This and other aspects will be apparent from the embodiments described below.

BRIEF DESCRIPTION OF THE DRAWINGS

In the following detailed portion of the present disclosure, the aspects, embodiments and implementations will be explained in more detail with reference to the example embodiments shown in the drawings, in which:

FIG. 3a shows an elevated front view of an eyeglass frame in accordance with yet another embodiment of the present invention;

FIG. 3b shows an elevated rear view of the embodiment shown in FIG. 3a;

FIG. 3c shows an exploded, elevated front view of the embodiment shown in FIGS. 3a and 3b;

FIG. 3d shows an exploded, elevated rear view of the embodiment shown in FIGS. 3a, 3b, and 3c;

FIG. 3e shows an elevated view of an optical element in accordance with one embodiment of the present invention;

FIG. 4a shows an elevated front view of an eyeglass frame in accordance with another embodiment of the present invention;

FIG. 4b shows an elevated rear view of the embodiment shown in FIG. 4a;

FIG. 4c shows an exploded, elevated front view of the embodiment shown in FIGS. 4a and 4b;

FIG. 5b shows an elevated view of an electronic device adapted for use with the embodiment shown in FIG. 5a;

DETAILED DESCRIPTION

Figure 1:
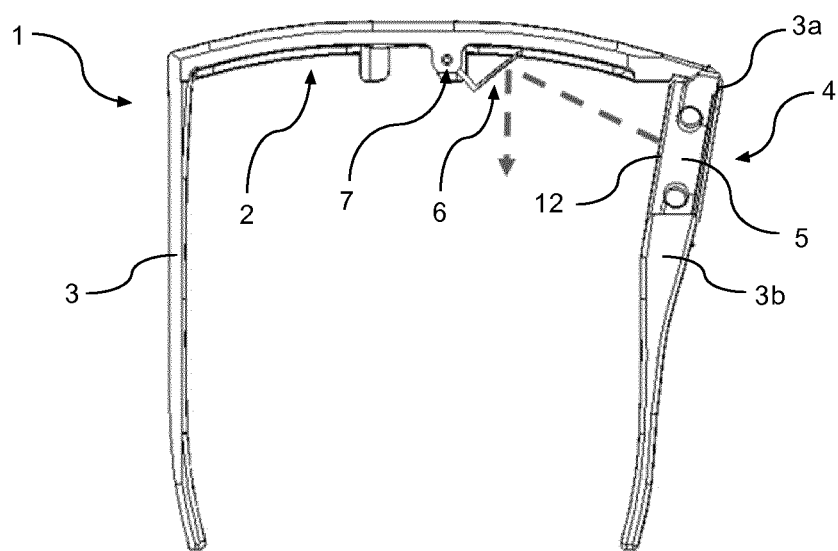
FIG. 1 shows a top view of an eyeglass frame in accordance with one embodiment of the present invention.

FIG. 1 shows an eyeglass frame 1, carrying a portable electronic device 5 and an optical element 6. The assembly of FIG. 1, including the electronic device 5 may also be referred to as smart glasses. FIG. 1 also shows, schematically by means of a dashed line, how an image shown on the display 12 of the electronic device is reflected to the eye of the user by means of the optical element 6.

The eyeglass frame 1 comprises a front piece 2, which may be adapted to rest on the nasopharynx of the user and for receiving prescriptive lenses 20 and/or tinted lenses 20, and two temples 3. A first end of each temple 3 is hingedly connected to one end of the front piece 2 to allow the temples 3 to move between a folded and an open position, the open position being utilized when the eyeglass frame is worn by a user. A second end of each temple 3 is a free end adapted to interact with, e.g. rest upon or curve around, the ear auricle of the user.

At least one of the two temples 3 comprises an adapter 4 for receiving an electronic device 5, e.g., in the form of a smart watch. In one possible embodiment, both temples 3 comprise an adapter 4 for receiving an electronic device 5, allowing said eyeglass frame 1 to be provided with two electronic devices 5.

The eyeglass frame 1 may also be provided with two optical elements 6. In an embodiment comprising two electronic devices 5 and two optical elements 6, each optical element 6 is preferably a reflective element adapted for reflecting light transmitted by the display of an electronic device 5 to an eye of the user.

The adapter 4 at least partially has larger outer dimensions than the remainder of the temple, e.g. in a plane approximately parallel with the face of the user or in a direction perpendicular to the extension (longitudinal) direction of the temple. The adapter bulges outwards in order to at least partially surround and cover the outer edge of the electronic device 5, i.e., the inner edge surface of the adapter 4 is at least partially concave such that it at least partially corresponds to the circumference of the electronic device 5, should the electronic device 5 have a circular shape. Clearly the adapter may be formed to correspond an electronic device having any shape. The adapted may thus be for instance rectangular- or square-shaped. Such corresponding shapes allow the electronic device 5 to be firmly received and maintained within the adapter 4, while still allowing the eyewear frame 1, more particularly the temple 3 to be as lightweight and comfortable as possible for the user.

Further, the adapter 4 is arranged such that the electronic device 5 can only be connected to the eyeglass frame 1 in one position, this position being one where possible features such as display 12, speaker 13, microphone 14, and camera 15 are all arranged in their one correct position. The correct position in this context is a position that allows correct functioning of the assembly including the eyeglass frame and the electronic device. This means for instance that in the final position of the electronic device the content as will be descried in detail below. In one embodiment, the electronic device 5 is arranged such that the display 12 is directed inwards, toward and parallel with the temple of a user, and the camera 15 is directed forward, toward the front piece 2 of the eyeglass frame 1.

In one embodiment, the front piece 2 comprises a shaft element 7, arranged on, or adjacent to, the bridge of the front piece 2. The shaft element 7 is preferably arranged above the nose pads of the front piece 2, and extends essentially in parallel with the main plane of the front piece 2, on the inner side of the front piece 2, when the eyeglass frame 1 is worn by the user.

The optical element 6 may be detachably connected to the shaft element 7 by means of a C-shaped gripper 8 adapted for snapping onto the shaft element 7. In other words, the optical element is releasably attached to the front piece 2 of the eyeglass frame 1. The optical element 6 may also be permanently connected to the front piece 2 by means of a ball joint.

The optical element 6 may comprise an arm 22, which preferably is plastically deformable such that the optical element 6 can be adapted to a specific user and/or situation. The arm 22 extends from the above-mentioned gripper 8, as shown in FIG. 3e, or ball joint, to an optical reflection means 21, which is adapted for reflecting light emitted by the display 12 of the electronic device 5 to the eye of the user. The optical reflection means 21 may comprise a semi-transparent or opaque surface such as a flat or at least partially curved screen. The optical reflection means 21 may be a reflective prism instead of a screen.

In one embodiment, the optical element 6 further comprises optical focusing means adapted for focusing the reflected light prior to it reaching the eye of the user. The optical element 6 may also comprise optical magnifying means.

The optical element 6 has at least two degrees of freedom. In embodiments comprising a shaft element 7 and a detachable C-shaped gripper 8, the gripper 8 may be slid along the shaft element 7, in parallel with the main plane of the front piece 2, as well as rotated around the shaft element 7 in a plane perpendicular to the main plane of the front piece 2. In embodiments comprising a ball joint, the optical element 6 may be rotated, simultaneously, in two planes perpendicular to the main plane of the front piece 2.

In one embodiment, see FIGS. 3a to 3d, one or both temples 3 comprise of a primary temple part 3a and a secondary temple part 3b. A first end of the primary temple part 3a is hinged to one end of the front piece 2, the same way as described above. A second end of the secondary temple part 3b is a free end adapted to interact with the ear auricle of the user. The remaining ends, i.e. the second end of the primary temple part 3a and the first end of the secondary temple part 3b, form an adapter 4 for receiving and interlocking with the electronic device 5. The adapter 4 comprises locking means 9, arranged at the above mentioned second end of the primary temple part 3a and first end of the secondary temple part 3b, respectively, and which interact with corresponding parts on opposite sides of the electronic device 5.

Figure 6:
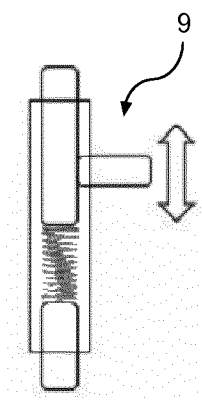
FIG. 6 shows a schematic side view of a locking means in accordance with one embodiment of the present invention.

The locking means 9 may comprise a locking pin protruding from opposing sides of the temple 3 and being adapted for interlocking with corresponding holes 24 (see FIG. 4c) in the electronic device 5. The holes may be for example holes for mounting a wrist band to the body of a smart watch. FIG. 6 shows a spring-loaded locking pin arranged inside a tubular housing. The locking pin is connected to a lever which extends perpendicularly to the locking pin and the housing, and protrudes outside of the housing. By pushing the lever, a section of the locking pin may be slid inwards into the housing, detaching the locking pin section from a corresponding hole 24 and allowing the electronic device 5 to be removed from the temple 3 or temple part 3a, 3b.

The locking means 9 may also comprise one or several snap locking elements or clamping elements.

The second end of the primary temple part 3a and the first end of the secondary temple part 3b have a shape which at least partially corresponds to the outer shape of the electronic device. In an embodiment where the electronic device 5 has a circular shape, the second end of the primary temple part 3a and the first end of the secondary temple part 3b are at least partially concave such that they, at least partially, have a shape which corresponds to the circumference of the electronic device 5.

The adapter 4 may also comprise a cover plate 10, for covering one side of an electronic device 5, the cover plate 10 being arranged such that it protrudes from the second end of the primary temple part in the longitudinal direction of the temple part and in a direction away from the hinged, first end of the primary temple part 3a. The cover plate, being far thinner than the width of the primary temple part 3a, preferably covers and supports the back of the electronic device 5 when the electronic device 5 is arranged within the adapter 4, i.e. the side which is opposite to the display 12. The cover plate 10 may have any suitable shape, but preferably the shape corresponds to the shape of the electronic device 5. E.g., if the electronic device 5 has a circular shape, the cover plate 10 is preferably also circular.

In another embodiment, the adapter 4 comprises a recess 11 provided on an inside of the temple 3, i.e. the side which will be closest to the face of the user when the eyeglass frame 1 is being worn. The recess 11 is adapted for retaining the electronic device 5 by means of a mechanical connection 23. In one embodiment, the electronic device 5 is press fit into the recess 11 and maintained in place by means of friction. The press fit may be achieved by means of protrusions arranged within the recess and interacting with the surface of the electronic device 5, or by the recess itself having a shape which at least partially corresponds to the outer shape of the electronic device 5. I.e., in an embodiment where the electronic device 5 is essentially circular, the recess is at least partially concave such that it, at least partially, corresponds to the circumference of the electronic device 5. The mechanical connection 23 may also comprise one or several snap locking elements or clamping elements, locking the electronic device 5 into place rather than using mere friction.

In one embodiment, the eyeglass frame 1 comprises one electronic device 5 attached to one temple 3. In a further embodiment, the eyeglass frame 1 comprises two electronic devices 5 attached to one temple 3 each. The electronic device 5 preferably comprises a wireless connection. Further, the electronic device 5 may comprise at least one of a display 12, a speaker 13, a microphone 14, a camera 15, a sensor, and/or a vibration motor. Any combination of these features is possible.

Figure 5A:
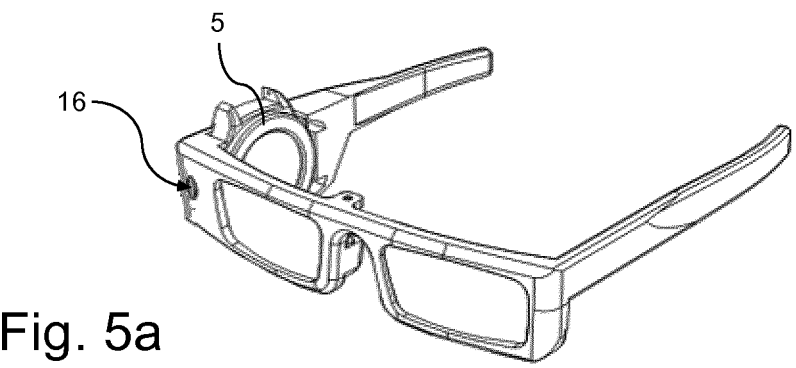
FIG. 5a shows an elevated front view of an eyeglass frame in accordance with a further embodiment of the present invention.
Figure 5B:
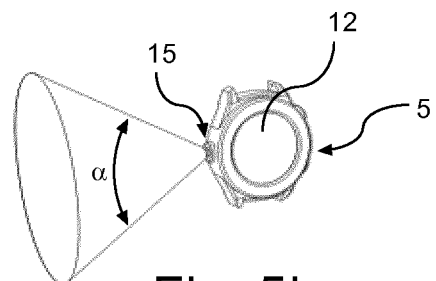

In one embodiment, the electronic device 5 comprises at least a camera 15. The front piece 2 comprises a through-going opening 16 which accommodates the camera viewing angle α of the camera 15, see FIGS. 5a and 5b. The camera may be used to record the surroundings or the user's hand gestures.

Figure 2:
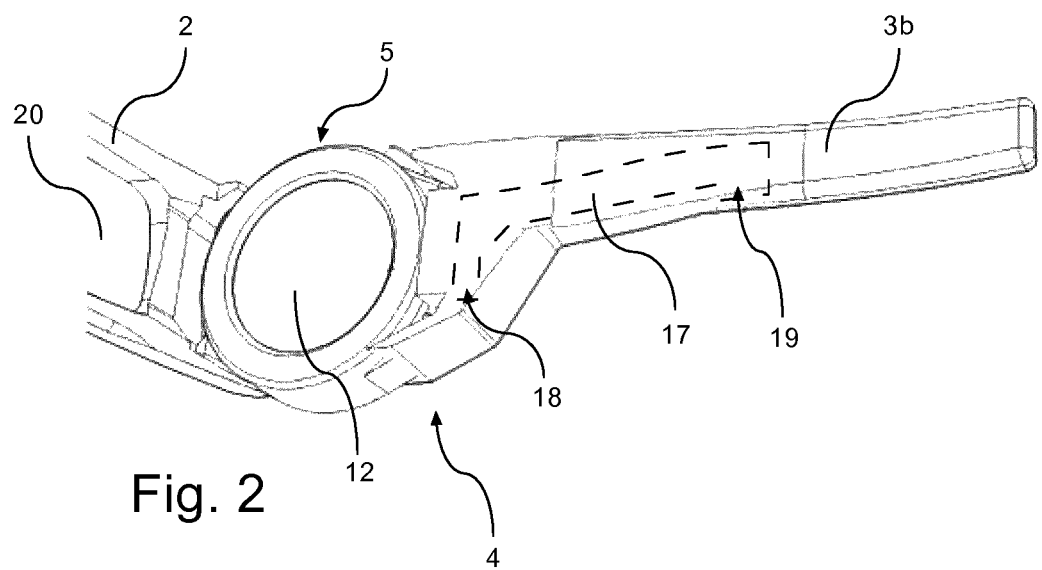
FIG. 2 shows a partial, elevated view of an eyeglass frame in accordance with a further embodiment of the present invention.

In a further embodiment, at least one of the temples 3, or second temple parts 3b, comprises an audio channel 17. FIG. 2 shows an audio channel 17 by means of a dashed line. The audio channel 17 extends longitudinally inside and along at least a part of the length of the temple 3 or second temple part 3b. The audio channel 17 has an audio inlet 18 preferably arranged within or in close connection with the adapter 4, such that the speaker 13 of the electronic device 5 is arranged adjacent the audio channel inlet 18 when the electronic device 5 is received within the adapter 4. The audio channel 17 further has an audio outlet 19 which is adapted for being in an ear region of a user, when the eyeglass frame 1 is being worn. The audio outlet 19 may be an opening directly in the temple, preferably directed inwards and/or downwards from the eyeglass frame 1 towards the user's ear when being worn. The audio inlet 18 may also be arranged within a protruding element, the protruding element projecting from the temple 3, 3b, preferably in a direction inwards and/or downwards from the eyeglass frame 1 towards the user's ear when being worn. The protruding element may be a flexible element adapted for being bent and shaped by the user such that the audio outlet 19 is arranged in a desired position, and furthermore stays in this position until being moved to another position. The protruding element may include at its free end an ear-plug with a speaker configured to be inserted in the ear of the user. Further, the audio channel may comprise active components such as an amplifier or a filter.

The various aspects and implementations has been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope.

The invention claimed is:

1. A system comprising:
   a smart watch; and
   an eyeglass frame comprising:
      a front piece;
      a pair of temples, wherein each temple is hinged to an end of the front piece to allow the pair of temples to move between a folded position and an open position, and wherein at least one temple of the pair of temples comprises an adapter to receive the smart watch; and
      an optical element connected to the front piece and configured to reflect light from the smart watch to an eye of a user.

2. The system of claim 1, wherein the optical element comprises a semi-transparent or an opaque surface.

3. The system of claim 1, wherein the optical element comprises an optical focuser.

4. The system of claim 1, wherein the optical element has at least two degrees of freedom.

5. The system of claim 1, wherein the front piece comprises a shaft element, and wherein the optical element is detachably connected to the shaft element by a C-shaped gripper for snapping onto the shaft element.

6. The system of claim 1, wherein the temple comprises:
   a primary temple part, wherein the primary temple part is hinged to the front piece; and
   a secondary temple part, wherein the adapter comprises a lock arranged at one end of each temple part, respectively, to interlock with the smart watch.

7. The system of claim 6, wherein the adapter further comprises a cover plate to cover one side of the smart watch.

8. The system of claim 1, wherein the adapter comprises a recess provided inside of the temple.

9. The system of claim 8, wherein the recess is configured to retain the smart watch by a mechanical connector.

10. The system of claim 9, wherein the mechanical connector comprises at least one of a snap locking element or a clamping element.

11. The system of claim 10, further comprising at least one smart watch.

12. The system of claim 11, wherein the smart watch comprises at least one of a display, a speaker, a microphone, a camera, a sensor, or a vibration motor.

13. The system of claim 12, wherein the front piece comprises an opening to accommodate a camera viewing angle of the camera.

14. The system of claim 13, wherein at least one of the pair of temples comprises an audio channel, and wherein the audio channel comprises:
   an audio inlet coupled within the adapter; and
   an audio outlet configured to be in an ear region of the user.

15. The system of claim 14, wherein the pair of temples comprises a protruding element, and wherein the protruding element comprises the audio outlet.

16. An eyeglass frame comprising:
   a front piece;
   a pair of temples, wherein each temple is hinged to an end of the front piece to allow the pair of temples to move between a folded position and an open position, wherein at least one temple of the pair of temples comprises an adapter to receive an electronic device, and wherein the electronic device comprises a smartwatch; and
   an optical element connected to the front piece and configured to reflect light from the electronic device to an eye of a user.

17. The eyeglass frame of claim 16, wherein the optical element comprises a semi-transparent or opaque surface.

18. The eyeglass frame of claim 16, wherein the optical element further comprises an optical focuser.

19. The eyeglass frame of claim 18, wherein the optical element has at least two degrees of freedom.

20. An eyeglass frame comprising:
   a front piece;
   a pair of temples, wherein each temple is hinged to an end of the front piece to allow the pair of temples to move between a folded position and an open position, and wherein at least one temple of the pair of temples comprises an adapter configured to be coupled to a smartwatch; and
   an optical element coupled to the front piece and configured to reflect light from the smartwatch to an eye of a user.

* * * * *